March 17, 1925.
R. LEEDOM
TUBE EXPANDING TOOL
Filed May 1, 1923
1,530,381
2 Sheets-Sheet 2
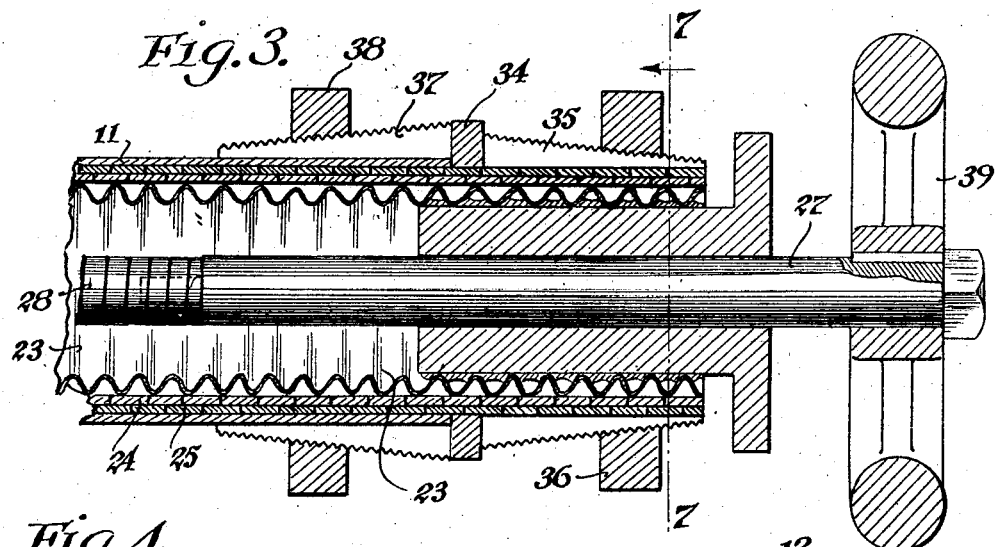
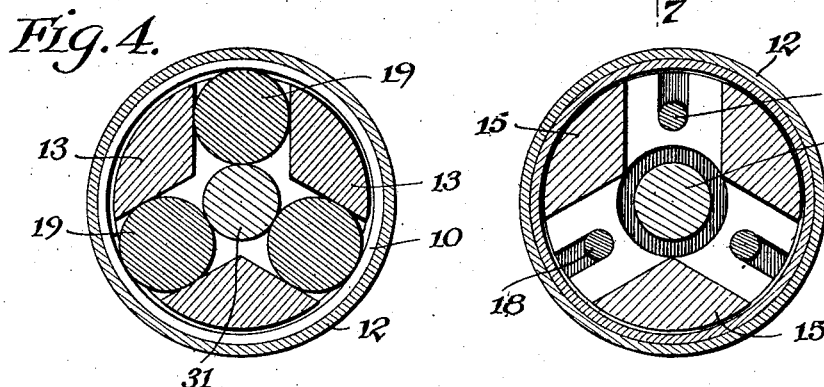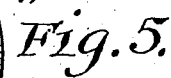
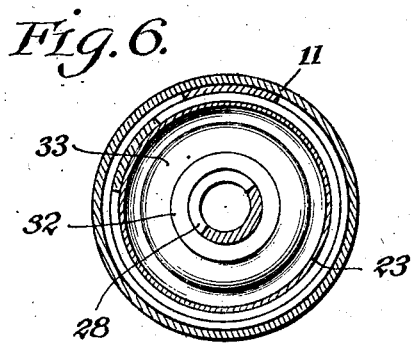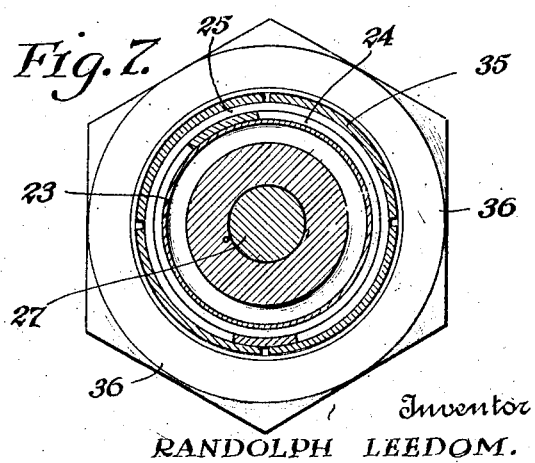
Inventor
RANDOLPH LEEDOM.
Eugene C. Brown
Attorney Patented Mar. 17, 1925.

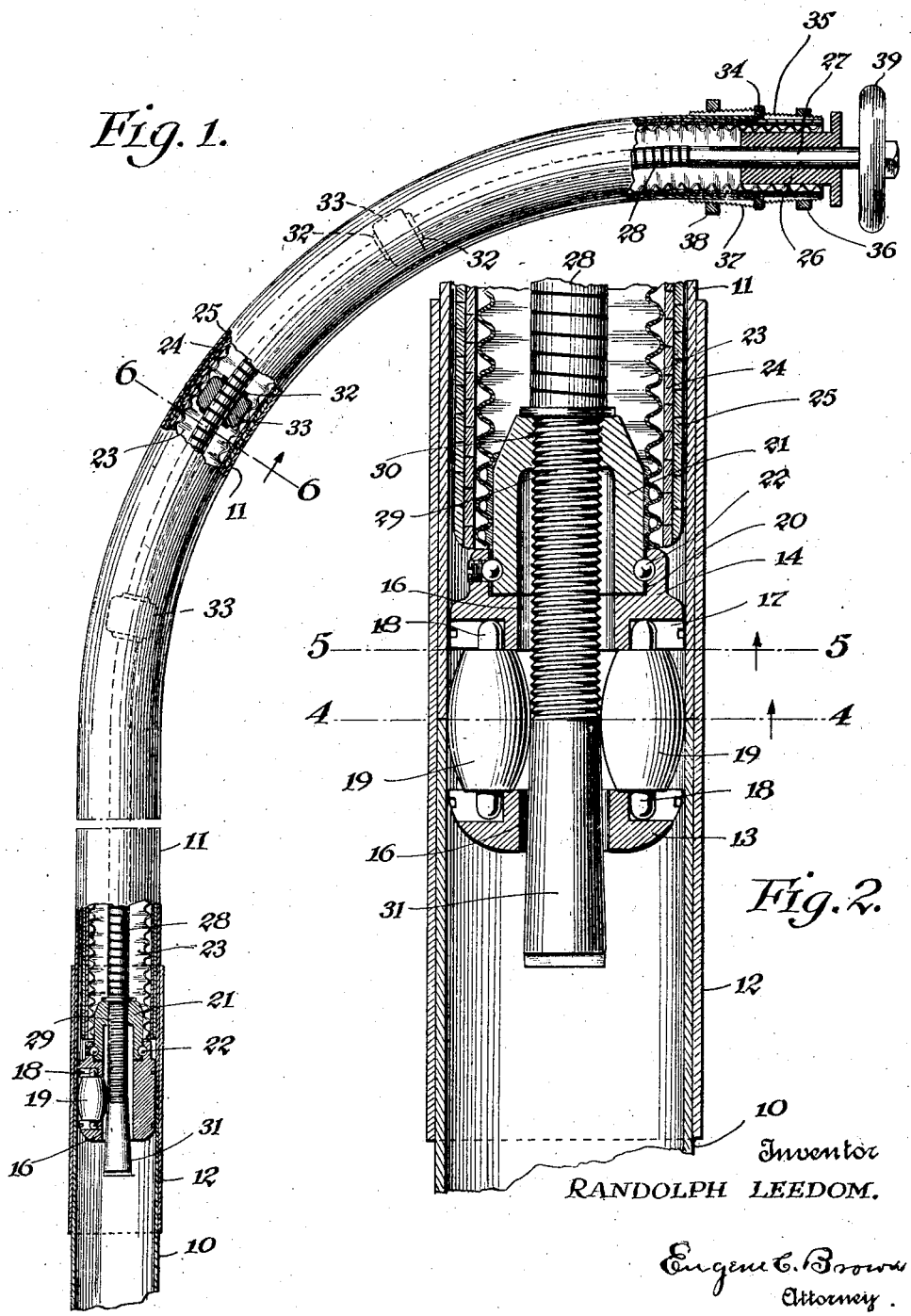

1,530,381

UNITED STATES PATENT OFFICE.

RANDOLPH LEEDOM, OF CLIFTON, NEW JERSEY, ASSIGNOR TO THE WESTERN UNION TELEGRAPH COMPANY, OF NEW YORK, N. Y., A CORPORATION OF NEW YORK.

TUBE-EXPANDING TOOL.

Application filed May 1, 1923. Serial No. 635,925.

*To all whom it may concern:*

Be it known that I, RANDOLPH LEEDOM, a citizen of the United States, residing at Clifton, in the county of Passaic and State of New Jersey, have invented certain new and useful Improvements in a Tube-Expanding Tool, of which the following is a specification.

This invention relates to apparatus for expanding tubes, and is especially adapted for expanding the sleeve joints uniting the sections of pneumatic tubes.

The tubes or pipes employed in conveyor systems, such as in pneumatic tubes, must have a smooth interior bore without obstructions at the joints and consequently, lap joints cannot be employed. For this reason it is usual to unite the ends of adjacent sections by slipping a closely fitting sleeve or thimble over the joint, and then expanding the tubes without the sleeve adjacent the ends by means of an expanding tool. The use of such a tool to form a joint between a straight portion of the tube and a curved section presents certain difficulties because the expander must be inserted through the curved section, and the driving shaft must extend through said curved section and be operated from the exterior at the open end. Pneumatic tubes are usually made of thin metal which is easily dented or bent.

The purpose of my invention is to provide an expanding tool which can be positioned and firmly held while forming the expanded interlock between the tube sections and the sleeve, and can be manipulated from the open end of a curved section without injuring or marring the tube.

A further object is to provide means for maintaining the drive shaft in central position within the tube to prevent any deformation of the tube, and also to secure the most efficient operation of the drive shaft.

In the accompanying drawings—

Figure 1 is a side elevation of a curved section of a pneumatic tube partly broken away to expose longitudinal sections of an expanding tool embodying the invention.

Fig. 2 is an enlarged view of the lower end of Fig. 1.

Fig. 3 is an enlarged view of the upper end of Fig. 1.

Figs. 4 and 5 are transverse sectional views on the lines 4—4 and 5—5, respectively, of Fig. 2.

Fig. 6 is a transverse sectional view on the line 6—6 of Fig. 1.

Fig. 7 is a transverse sectional view on the line 7—7 of Fig. 3.

In Fig. 1 it will be seen that the expander is shown with the expander head in position to expand the abutting ends of a straight section 10, and curved section 11 of a pneumatic tube, these sections having the sleeve or collar 12 fitting over the joint. The tool consists essentially of an expander head, a mandrel through which extends a flexible shaft for operating the head, mandrel and tube clamping means at the end of the mandrel remote from the head, and an operating wheel at the last mentioned end of the mandrel and carried on the shaft. These parts will now be described in detail.

The expander head consists of an outer end member 13, and an inner end member 14 connected by longitudinal ribs or bars 15, these parts being all preferably made integral. Through the center of the heads 13 and 14 are provided alined openings 16, and in the confronting faces of said heads are slots 17 wherein move the journal ends 18 of expansion rollers 19, which are preferably of truncated spindle shape. The head 14 is provided with a recess 20 wherein fits the tubular end member 21 of the mandrel, bearing balls 22 being provided between said tubular end member and said head 14 in order that the head may freely revolve on said tubular member.

The mandrel consists of an inner corrugated tube 23 to which, at one end, the tubular end member is secured by brazing or welding, this member fitting within the end of the corrugated inner tube 23. Wound on this corrugated inner tube is a coil of flat wire 24, while a similar coil 25 is wound over the coil 24 in such manner as to break joints with said coil. In this way a stout but flexible tube is built up for the mandrel, which is of such diameter as to fit reasonably close within the pneumatic tube which it is intended to expand. In the other end of the mandrel is secured a bearing member 26, and through this bearing member passes the solid portion 27 of an actuating shaft, the main part of which is composed of a length of flexible shafting 28, which may be of any desired or preferred form. At the expander head this flexible shafting carries an expander pin which has a straight screw-threaded shank portion 29 extending through a screw-threaded openings 30 formed in the tubular member 21. At its extremity this expander pin is provided with a tapered end 31, which is arranged with the small end toward the body of the flexible shaft. At intervals along the flexible shaft there are provided pairs of collars 32, and between the collars of each pair the shaft passes through a bearing member 33 which fits snugly within the corrugated inner mandrel member 23.

In order to properly position the expansion rollers 19, it is necessary that means be provided to hold the operating end of the mandrel and shaft in correct position, and to this end there is provided a double clamp which consists of a centrally disposed ring 34 having a split tapered sleeve 35 projecting therefrom at one side, the inner diameter of this sleeve being such as to fit rather closely on the outer coil 25 of the mandrel. This sleeve is threaded exteriorly, and on it is screwed a threaded compression nut 36, so that by rotating the nut in the proper direction, the split sleeve 35 can be clamped tightly to the mandrel in any desired position. In like manner, there extends from the ring 34 in a direction opposite the sleeve 35 a second split, tapered and threaded sleeve 37, which is of proper dimensions to fit on the exterior of the pneumatic tube, and which can be compressed on that tube by a compression nut 38.

Thus in the operation of the device the double clamping arrangement can be adjusted on the end of the pneumatic tube and there clamped securely. The mandrel and expander head can be adjusted by sliding the mandrel back and forth through the sleeve 35 until the proper position is reached whereupon the mandrel can be clamped in that position by means of the nut 36. A handle or hand wheel 39 is provided on the shaft 27 for the purpose of rotating said shaft and the expander pin 31.

In operating the device the sections of the pneumatic tube are brought together within the sleeve 12, and the expander head is positioned so that the centers of the expansion rollers 19 will lie opposite the joint between the tube portions 10 and 11. The mandrel is then clamped in this position, as before described. Next the handle or hand wheel 39 is rotated, and it will be observed that as this handle is rotated, the expanded pin 31 will not only rotate but, by reason of the threaded engagement of the portion 29 of the pin with the mandrel 21, it will be moved to telescope into the end of the mandrel. Thus, the action will be to rotate the expansion rollers 19 through frictonal engagement therewith, and at the same time to move them outward so that a slight bead is rolled at the ends of the tubes 10 and 11, and thus these tubes are locked firmly into the sleeve 12. It is preferable that this operation be repeated one or more times at spaced intervals along the portions of the tubes 10 and 11 which are covered by the sleeve 12 so that, by a series of slight beadings of these tube ends, a very firm lock is obtained without distorting the tube ends at their junctions to such an extent as to hinder the smooth passage of the usual pneumatic carriers through the tubes.

It will be obvious that after the tubes have been expanded, the motion of the wheel 39 is reversed so that the rollers 19 are allowed to collapse, and thus permit the free withdrawal of the expander wheel when the entire expanding operation is completed. Moreover, it will be seen that by the provision of intermediate bearings and the peculiar construction of the flexible mandrel, there can be neither injury to the thin pneumatic tubes from the action of the flexible shaft, nor collapse of such tubes through accidental bending of the part occupied by the mandrel.

It will now be plain that with this device very efficient connections can be made for pneumatic tubes, and it will also be apparent that the invention may be modified in various details by those skilled in the art without in any way departing from the general principles involved, so that it is not only desired to protect the specific embodiment herein disclosed, but also to protect all such variations as may properly come within the scope claimed.

I claim:

1. A tube expander for curved tubes, including a flexible hollow mandrel, an expander head at one end of said mandrel, a flexible shaft extending through said mandrel and connected to the head for actuating the same, said head having means causing it to expand upon rotation of the shaft, and means at the other end of said mandrel for actuating said shaft.

2. A tube expander for curved tubes, including a flexible hollow mandrel, an expander head rotatably mounted on the mandrel at one end thereof, a bearing at the other end of said mandrel, a flexible shaft extending through the mandrel, said shaft being journaled at one end in said bearing and having its other end connected to the expander head to actuate the same, said head having means causing it to expand upon rotation of the shaft, and means on the journaled end of the shaft for imparting rotary motion thereto.

3. In a device of the kind described, a flexible mandrel, an end member secured to one end of the mandrel and having a threaded opening therein constituting a nut, an expander head body rotatably supported on said end member and carrying expander rolls mounted for free rotative movement and movable radially with respect to the head body, an expander pin mounted centrally of said rolls and having a threaded end engaging said nut, a flexible shaft connected to the expander pin and passing through said mandrel, and means on said shaft to impart rotative movement thereto.

4. In a device of the kind described, a flexible mandrel, an end member secured to one end of the mandrel and having a threaded opening therein constituting a nut, an expander head body rotatably supported on said end member and carrying expander rolls mounted for free rotative movement and movable radially with respect to the head body, an expander pin mounted centrally of said rolls and having a threaded end engaging said nut, a flexible shaft connected to the expander pin and passing through said mandrel, a bearing mounted in said mandrel at the end remote from the expanded head and having the end portion of the flexible shaft journaled therein and projecting therefrom, and means on the projecting shaft end for rotating the shaft.

5. A tube expander for curved tubes, including a flexible hollow mandrel, an expander head at one end of said mandrel, a flexible shaft extending through said mandrel and connected to the head for actuating the same, said head having means causing it to expand upon rotation of the shaft, means at the other end of said mandrel for actuating said shaft, and spaced bearings in said mandrel supporting said shaft centrally of the mandrel.

6. A tube expander for curved tubes, including a flexible hollow mandrel, an expander head rotatably mounted on the mandrel at one end thereof, a bearing at the other end of said mandrel, a flexible shaft extending through the mandrel, said shaft being journaled at one end in said bearing and having its other end connected to the expander head to actuate the same, said head having means causing it to expand upon rotation of the shaft, and means on the journaled end of the shaft for imparting rotary motion thereto, and other bearings spaced within the mandrel intermediate its ends and supporting the shaft centrally of the mandrel.

7. In a device of the kind described, a flexible mandrel, an end member secured to one end of the mandrel and having a threaded opening therein constituting a nut, an expander head body rotatably supported on said end member and carrying expander rolls mounted for free rotative movement and movable radially with respect to the head body, an expander pin mounted centrally of said rolls and having a threaded end engaging said nut, a flexible shaft connected to the expander pin and passing through said mandrel, means on said shaft to impart rotative movement thereto, and spaced bearings in said mandrel supporting said shaft centrally of the mandrel.

8. In a device of the kind described, a flexible mandrel, an end member secured to one end of the mandrel and having a threaded opening therein constituting a nut, an expander head body rotatably supported on said end member and carrying expander rolls mounted for free rotative movement and movable radially with respect to the head body, an expander pin mounted centrally of said rolls and having a threaded end engaging said nut, a flexible shaft connected to the expander pin and passing through said mandrel, a bearing mounted in said mandrel at the end remote from the expander head and having the end portion of the flexible shaft journaled therein and projecting therefrom, means on the projecting shaft end for rotating the shaft, and other bearings spaced within the mandrel intermediate its ends and supporting the shaft centrally of the mandrel.

9. A tube expander for curved tubes, including a flexible hollow mandrel, an expander head at one end of said mandrel, a flexible shaft extending through said mandrel and connected to the head for actuating the same, means at the other end of said mandrel for actuating said shaft, and a clamp at the end of the mandrel slidable therealong and provided with means to secure the mandrel in adjusted position in the clamp, said clamp also having means for securing the clamp to a tube for positioning the mandrel therein.

10. A tube expander for curved tubes, including a flexible hollow mandrel, an expander head rotatably mounted on the mandrel at one end thereof, a bearing at the other end of said mandrel, a flexible shaft extending through the mandrel, said shaft being journaled at one end in said bearing and having its other end connected to the expander head to actuate the same, means on the journaled end of the shaft for imparting rotary motion thereto, and a clamp at the end of the mandrel slidable therealong and provided with means to secure the mandrel in adjusted position in the clamp, said clamp also having means for securing the clamp to a tube for positioning the mandrel therein.

11. In a device of the kind described, a flexible mandrel, an end member secured to one end of the mandrel and having a threaded opening therein constituting a nut, an expander head body rotatably supported on said end member and carrying expander rolls mounted for free rotative movement and movable radially with respect to the head body, a tapered expander pin mounted centrally of said rolls and having a threaded end engaging said nut, a flexible shaft connected to the expander pin and passing through said mandrel, means on said shaft to impart rotative movement thereto, and a clamp at the end of the mandrel slidable therealong and provided with means to secure the mandrel in adjusted position in the clamp, said clamp also having means for securing the clamp to a tube for positioning the mandrel therein.

12. In a device of the kind described, a flexible mandrel, an end member secured to one end of the mandrel and having a threaded opening therein constituting a nut, an expander head body rotatably supported on said end member and carrying expander rolls mounted for free rotative movement and movable radially with respect to the head body, a tapered expander pin mounted centrally of said rolls and having a threaded end engaging said nut, a flexible shaft connected to the expander pin and passing through said mandrel, a bearing mounted in said mandrel at the end remote from the expander head and having the end portion of the flexible shaft journaled therein and projecting therefrom, means on the projecting shaft end for rotating the shaft, and a clamp at the end of the mandrel slidable therealong and provided with means to secure the mandrel in adjusted position in the clamp, said clamp also having means for securing the clamp to a tube for positioning the mandrel therein.

13. In a device of the kind described, a flexible mandrel consisting of an inner corrugated tube, a wrapping of flat wire wound spirally upon and supported by the tube, and a second wrapping of flat wire wound spirally around the first wrapping and having its convolutions staggered in relation to the convolutions of the first wrapping whereby to break joints therewith.

In testimony whereof I affix my signature.

RANDOLPH LEEDOM.